July 15, 1941.  F. D. BRADDON  2,249,345
GYRO COMPASS
Filed March 13, 1940  2 Sheets-Sheet 1
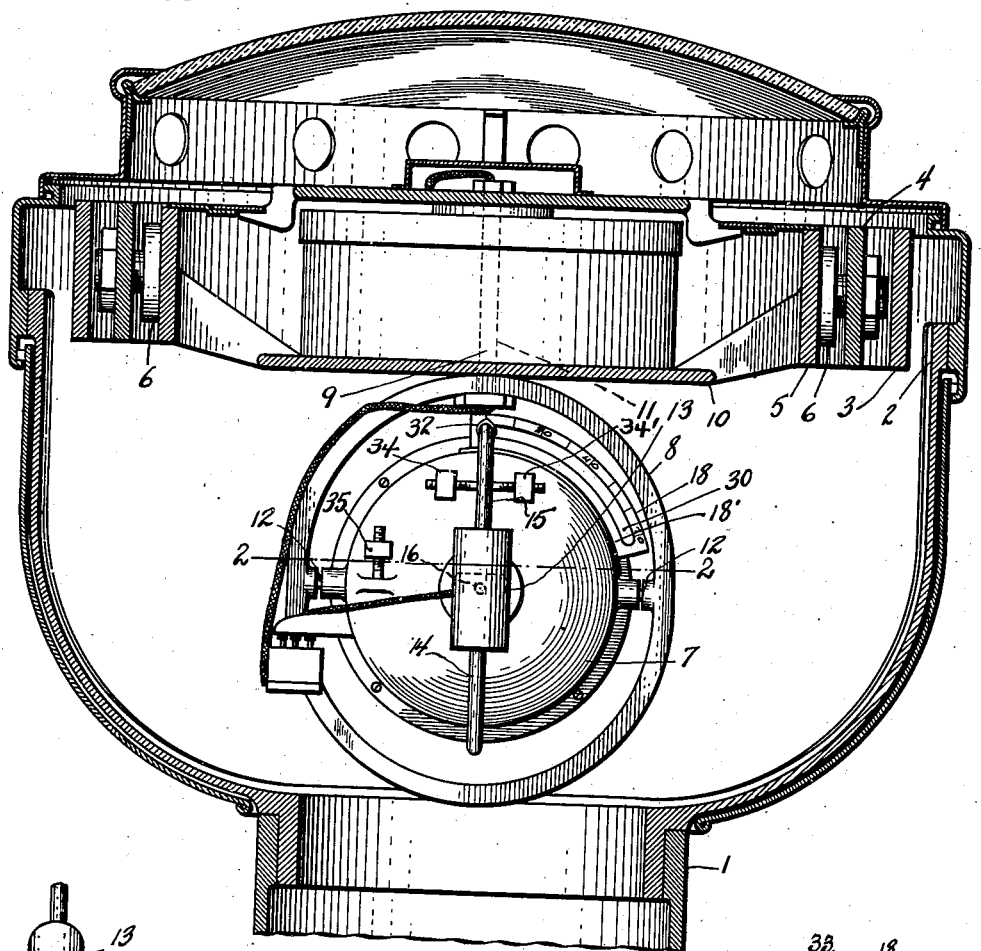
FIG. 1
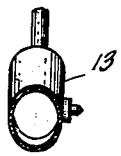
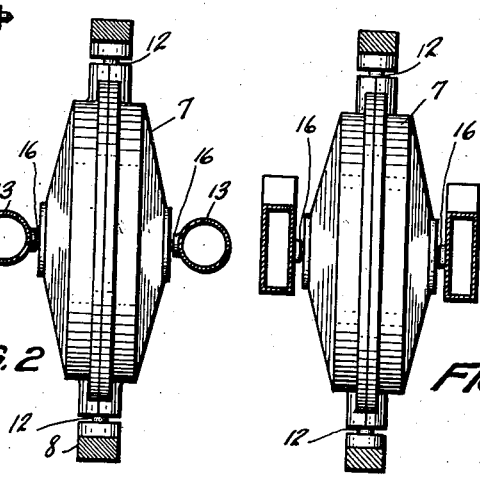
FIG. 2  FIG. 5
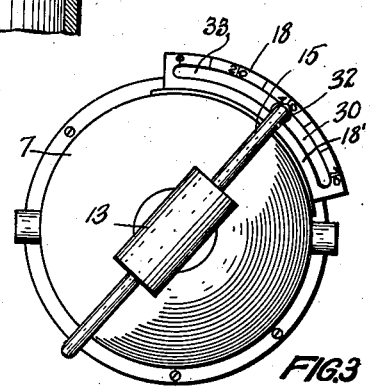
FIG. 3
INVENTOR
FREDERICK D. BRADDON
BY Herbert H. Thompson
his ATTORNEY July 15, 1941.                F. D. BRADDON                2,249,345
                                GYRO COMPASS
                          Filed March 13, 1940           2 Sheets-Sheet 2
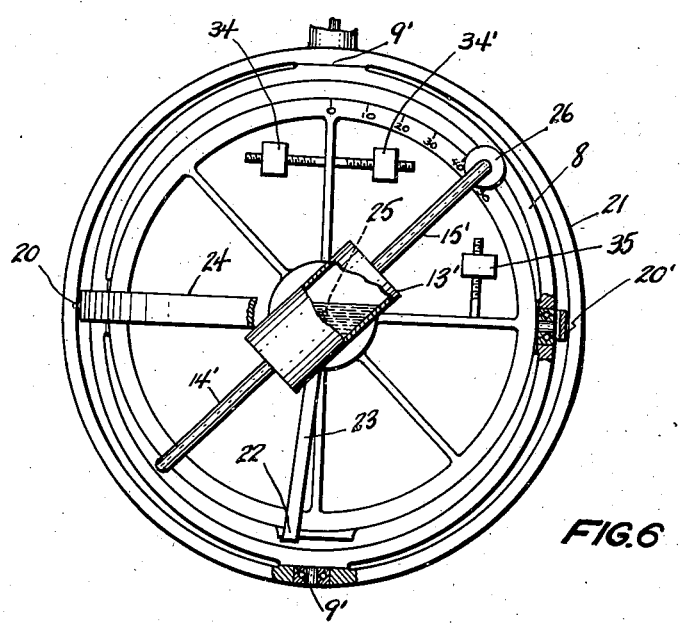
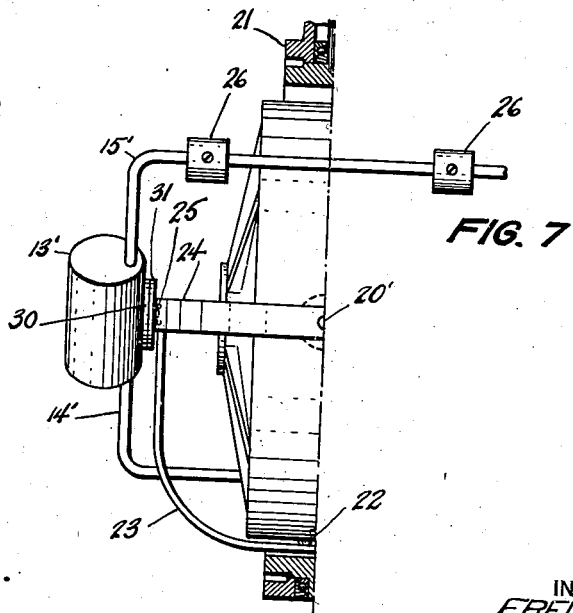
INVENTOR
FREDERICK D. BRADDON,
BY
Herbert H. Thompson
his ATTORNEY Patented July 15, 1941

2,249,345

UNITED STATES PATENT OFFICE 2,249,345

GYRO COMPASS

Frederick D. Braddon, Babylon, N. Y., assignor to Sperry Gyroscope Company, Inc., Brooklyn, N. Y., a corporation of New York Application March 13, 1940, Serial No. 323,654

7 Claims. (Cl. 33—226)

This invention relates to gyro compasses and more particularly to an improvement in means for keeping the natural period of the compass constant in different latitudes, which is important in accurate gyro compasses. In the present invention, an improved means for accomplishing this purpose in gyro compasses employing a liquid ballistic or gravitational element is devised by which the gravitational moment for unit tilt of the gyro is varied with the latitude merely by altering the angular position of the mercury pots on the compass in one simple operation.

Referring to the drawings showing my invention as applied to several forms of compasses:

Fig. 1 is a vertical section through the housing of a gyro compass having a liquid gravitational element, showing the gyroscope or sensitive element in south elevation.

Fig. 2 is a horizontal section taken approximately on line 2—2 of Fig. 1, the rotor casing, however, being shown in plan.

Fig. 3 is a north elevation of the rotor casing showing the mercury ballistic adjusted for 40° latitude (north or south).

Fig. 4 is a horizontal section through one of the mercury pots when in the position shown in Fig. 3.

Fig. 5 is a horizontal section similar to Fig. 2, showing a rectangular form of mercury pots in an inclined position.

Fig. 6 is a north elevation of a different form of gyro compass, showing my invention applied to a gyro compass having a follow-up system.

Fig. 7 is a vertical section of the same.

Fig. 8 is a detail, showing the means employed in Figs. 1 to 5 for holding the liquid ballistic in the adjusted position.

Fig. 1 is intended to represent any ordinary form of gyro compass, the same being supported on a pedestal 1 within outer bowl 2. The compass proper is universally supported from a binacle ring 3, spring mounted within the bowl. For this purpose, a gimbal ring 4 is pivoted within ring 3 or pivots (not shown), which ring, in turn, supports the compass frame or spider 5 on horizontal trunnions 6—6. The sensitive element proper comprising the rotor bearing casing 7 and vertical ring 8 is mounted for free rotation about vertical axis 9 within the supporting frame 10 carried by spider 5. For this purpose the ring 8 may be supported by the vertical shaft 11 which, in turn, is supported in some manner in the frame 10 for turning about a vertical axis, as by mercury floats or air bearings or other suitable means. Vertical ring 8 is shown as supporting the rotor bearing casing 7 on horizontal trunnions 12—12.

The rotor and its casing are preferably balanced in neutral equilibrium about the trunnions 12—12 except for the gravitational factor or element which, in this case, comprises liquid containers or pots 13—13 interconnected by a pipe 14 passing under the bottom of the gyro casing to permit interchange of liquid between the pots. Preferably, a similar interconnecting pipe 15 is also employed at the top so that the system may be sealed off from contact with the air and the proper throttling of the liquid secured without breaking up the liquid column.

Instead of fixing the containers to the gyro casing as is usually done, I pivotally support the entire gravitational element or container frame 13, 14 and 15 for adjustment about horizontal axis 16—16 normal to axis 12—12 and which is therefore in line with or parallel to the spin axis of the rotor. For this purpose, each pot is rotatably mounted on the side of the gyro casing in line with the spin axis so that the gravitational unit may be adjusted at the desired angle of inclination to the vertical. The pots themselves may be of any suitable form such as cylindrical, square or rectangular, the cylindrical form being shown in Figs. 1 to 4 and the rectangular form in Fig. 5.

A scale 13 graduated in degrees of latitude may be provided on top of the gyro casing which is adapted to be read in connection with a reference on the upper tube 15. It has been demonstrated and may be shown experimentally that the effective torque exerted by the liquid in the ballistic varies directly with the upper free surface of the liquid. Therefore, with the pots in the vertical position, the free surface of the liquid is a minimum so that Fig. 1 shows the position of the pots on the equator. It is also known that the proper torque to keep the period constant should vary as the secant of the latitude.

With straight sided pots as is shown in Fig. 4, a uniform latitude scale may be employed and the pots tilted through the angle indicated on the scale. By this means very accurate adjustment of the period may be obtained.

My invention is also applicable to a form of the compass having a follow-up system, as shown in Figs. 6 and 7. The type of compass shown is a usual Sperry compass such as shown in the patent to Harrison and Rawlings, 1,362,940, dated December 21, 1920. According to this system, the liquid containers 13' or gravitational element instead of being supported by the gyro casing as shown in the first form of the invention are pivoted on an E—W axis, 20, 20', on the follow-up ring 21 and are connected to the gyro casing at one point 22 only by an arm 23, said point of connection lying slightly off center to secure damping, as is well understood in the art. Instead of pivoting the gravitational element directly to the follow-up ring, I interpose an additional ring 24 which is pivoted to the follow-up ring 21 on E—W axis 20, 20' and to which the container frame is pivoted on a N—S axis 25.

In this case, the arm 23 connects the ring 24 and a point 22 on the bottom of the gyro case. In these figures the vertical ring is again shown at 8, the ring in this case being freely mounted about a vertical axis 9'—9' within the follow-up ring 21. In this form of the invention, the liquid container frame or ballistic may be held in any adjusted position by friction discs of soft felt, for instance, 30 placed between the containers 13' and 14' and collars 31 on the ring 24.

A similar result is accomplished in the first described form of the invention by providing a slip-friction connection between the adjustable container frame and the gyro casing. For this purpose, a grooved collar 32 may be mounted on the top of the pipe 15 so as to engage the metal frame 18 both above and below the arcuate slot 33 therein, through which the tube passes. To provide a moderate amount of friction, a felt facing may be placed between the inner surface of the groove and the parts 18 and 18'.

In order that tilting of the container frame may not affect the compound balance of the gyro compass as a whole in all forms of the invention, the location of the trunnions 16 or 25 is selected with respect to level of the liquid so that the center of gravity of the system is not displaced E—W laterally by a change of inclination of the containers. For this purpose, said trunnion axis (16 or 25) is positioned slightly below the free surface of the liquid. Any slight change in balance that may occur, may obviously be compensated, if necessary, by rearranging laterally adjustable masses 34—34' on the gyro casing in the E—W direction. Any vertical shift in the position of the center of gravity of the system caused by different inclinations may be compensated for by vertically adjusting the mass 35 on the gyro case. Masses 26 are for the purpose of counterbalancing the weight of the liquid in the lower tube and may also be made adjustable for balancing purposes.

As many changes could be made in the above construction and many apparently widely different embodiments of this invention could be made without departing from the scope thereof, it is intended that all matter containing in the above description or shown in the accompanying drawings shall be interpreted as illustrative and not in a limiting sense.

Having described my invention, what I claim and desire to secure by Letters Patent is:

1. In a liquid controlled gyro compass, a sensitive element including a gyro rotor and case, interconnected liquid containers situated N—S of said element and connected thereto to impart gravitational control on tilt of said element, and means mounting said container for tilting relative to the case about a N—S axis to vary the free surface of the liquid for maintaining the period constant in different latitudes.

2. In a liquid controlled gyro compass, a sensitive element, interconnected liquid containers situated N—S of said element and connected thereto to impart gravitational control on tilt of said element, a N—S pivotal mounting for said containers whereby the same may be adjusted about said axis, and a latitude scale adjacent thereto whereby the angle that the containers make the horizontal may be set in accordance with the latitude.

3. In a gyro compass, the combination with the sensitive element and the liquid controlled gravitational factor including interconnected liquid containers, of means for varying the effective gravitational factor for maintaining the period constant in different latitudes, comprising means for pivotally mounting said liquid containers about a N—S axis, whereby the free surface of the liquid may be varied in accordance with the latitude.

4. In a gyro compass having a sensitive element and a follow-up element, a gravitational element pivoted on the follow-up element on an E—W axis and connected to the sensitive element, said follow-up element having liquid containers mounted thereon on opposite sides of said sensitive element permitting liquid movement in the N—S direction, on tilt about said axis, and an additional N—S pivotal mounting between said follow-up and gravitational elements, whereby said containers may be tilted about said N—S axis in accordance with the latitude.

5. A liquid controlled gyro compass as claimed in claim 2, wherein said containers are of generally rectangular horizontal cross section, whereby the latitude scale may be uniformly graduated in degrees.

6. In a gyro compass, the combination with the sensitive element and the liquid controlled gravitational factor including interconnected liquid containers, of means for varying the effective gravitational factor for maintaining the period constant in different latitudes, comprising means for pivotally mounting said liquid containers about a N—S axis, whereby said containers may be tilted relative to the sensitive element, and means for holding said containers in a desired inclination.

7. In a gyro compass having a sensitive element and a follow-up element, a gravitational element pivoted on the follow-up element for pivotal mounting about an E—W axis and connected to the sensitive element, said gravitational element including interconnected liquid containers positioned on opposite sides of said sensitive element permitting liquid movement in the N—S direction, on tilt of the sensitive element about said axis, an additional N—S pivotal mounting between said follow-up and gravitational elements, and slip friction means at said additional pivotal mounting and acting between the follow-up and gravitational elements for maintaining said containers tilted at the desired angle.

FREDERICK D. BRADDON.